_United States Patent_ [15] 3,665,826
Karpol [45] May 30, 1972

[54] SOLENOID-ACTUATED MASK FOR AUTOMATIC EXPOSURE CONTROL FOR CAMERAS

[72] Inventor: Zvi Y. Karpol, Bronx, N.Y.

[73] Assignee: Keystone Division-Berkey Photo, Paramus, N.J.

[22] Filed: Jan. 19, 1971

[21] Appl. No.: 107,816

[52] U.S. Cl. .................................. 95/10 CD, 95/59, 95/64 C
[51] Int. Cl. ...................... G03b 7/08, G03b 9/58, G03b 9/10
[58] Field of Search .............. 95/10 C, 10 CD, 10 CE, 10 CT, 95/64 R, 64 C, 59, 58

[56] References Cited

UNITED STATES PATENTS

| | | | |
|---|---|---|---|
| 3,455,218 | 7/1969 | Eagle et al. | 95/10 CT |
| 3,482,497 | 12/1969 | Ernisse | 95/10 CD |
| 3,491,664 | 1/1970 | Ernisse | 95/10 CD |
| 3,511,145 | 5/1970 | Ort | 95/10 CD |

Primary Examiner—Joseph F. Peters, Jr.
Attorney—Ralph R. Roberts

[57] ABSTRACT

This invention pertains to a camera mechanism in which the aperture and shutter are automatically set by means of a light sensor whose output is connected to an electrical circuit disposed to actuate a solenoid or holding relay which is operatively engaged to a pivotal arm having a mask portion with contoured apertures movable in front of both the aperture and light sensor. This arm is frictionally retained upon a pivot pin and is moved from an "at-rest" condition to a determined exposure condition by means of the solenoid as it is moved by the shutter release lever. The mask arm in its normal or "at-rest" condition is disposed in the maximum open condition to provide a maximum exposure to the film when the shutter is actuated. During the movement of the release lever the mask arm is moved by means of the holding action of the actuated moving solenoid until a correct setting of aperture and shutter has been achieved as ascertained by the light sensor output. When this setting is reached the current to the solenoid is cut off, releasing the holding action of the solenoid to the mask arm. This arm, after it is released, and because of the friction at the pivot pin, is caused to stop at this correct setting.

13 Claims, 6 Drawing Figures

Patented May 30, 1972

INVENTOR.
ZVI Y. KARPOL
BY
Ralph R. Roberts
AGENT.

Patented May 30, 1972

INVENTOR.
ZVI Y. KARPOL
BY
Ralph R Roberts
AGENT.

INVENTOR
ZVI Y. KARPOL
BY
Ralph E. Roberts
AGENT.

SOLENOID-ACTUATED MASK FOR AUTOMATIC EXPOSURE CONTROL FOR CAMERAS

CROSS-REFERENCE TO RELATED APPLICATION

This invention pertains to a camera mechanism such as is shown in U.S. Pat. application Ser. No. 827,650 filed May 26, 1969, in the name of S. OKI, and entitled, "Camera Mechanism for Rotating a Lamp Socket".

BACKGROUND OF THE INVENTION

1. Field of the Invention

In reference to the classification of art as established in the United States Patent Office, the art to which the present invention pertains is found in the class entitled, "Photography", and more particularly in the subclass of "Actinometers", and in the subclasses of "cameras" with "shutters", and with "-diaphragms".

2. Description of the Prior Art

Cameras with mechanism adapted to automatically adjust the aperture to existing light condition are well known. Many of these mechanisms are elaborate, delicate and expensive due mostly to the mechanical means for adjusting the diaphragm opening to a determined extent commensurate with the light level of the scene being photographed. In a great many of the known systems the current output of an electric eye or light sensor is used to establish the desired exposure opening. An automatic exposure control is a desirable feature on cameras in that it relieves the operator of the camera from the necessity of adjusting the exposure setting so as to avoid an over or under exposure. To extend the convenience of automatic exposure control to cameras of modest cost requires that the exposure system must be made as rugged and inexpensively as possible while still providing reasonably accurate and consistent results.

Among the camera mechanisms providing automatic control are systems employing a solenoid or the like for at least a portion of the actuation. Several systems are described in United States Patents, among which are U.S. Pat. Nos.: 3,435,745 of April 1, 1969 to FUKUSHIMA; 3,439,597 of Apr. 22, 1969 to WAGNER; 3,455,218 of July 15, 1969 to EAGLE et al; 3,459,112 of Aug. 5, 1969 to STARP et al; 3,460,450 of Aug. 12, 1969 to OGIHARA; 3,466,447 of Sept. 9, 1969 to FAHLENBERG; 3,491,664 of Jan. 27, 1970 to ERNISSE, and 3,379,107 of Apr. 23, 1968 to LIESER et al.

BRIEF DESCRIPTION OF THE INVENTION

This invention may be described at least in part with reference to its objects.

It is an object of this invention to provide, and it does provide, an automatic exposure control for a camera in which the signal output of a light sensor is used to control an electronic circuit so as to cut off the effective pull of a solenoid or electromagnet, which is carried by a shutter release lever, which as it moves pulls a mask arm adapted to vary the exposure opening of the lens of the camera.

It is a further object of this invention to provide, and it does provide, an automatic exposure control in which a shutter release lever carries a solenoid or electromagnet operatively adapted to actuate a mask arm when current is caused to flow to the solenoid. Cutoff of the current flow to the solenoid is effected by the output current signal from a light sensor, said signal being varied in response to the light level of the scene being photographed.

The automatic exposure control for a camera mechanism as provided in this invention utilizes a light sensor whose electrical current output is varied in response to the light level of the scene being photographed. This current level output is used to actuate a circuit in which current is fed to a small solenoid used as an electromagnet until a current flow from the light sensor reaches a certain level. At this determined light level the output from the sensor causes an unbalance in the circuit causing a triggering action resulting in the cutoff of the current flow to the solenoid. This light responsive cutoff is used to regulate the degree or amount of movement of a mask arm which has a contoured aperture disposed to provide a variable exposure opening for use with the lens of the camera. This same mask arm also has a contoured opening regulating the amount of light received by the light sensor. The solenoid is carried on a shutter actuating or release lever and is movable with it. The mask arm is pivotally carried on a pivot pin and is frictionally restrained in its movement by a cup-shaped spring, or wave-shaped washer, providing a determined brake action to the rotational movement of the arm. The arm is provided with an attracting bar by which the solenoid or electromagnet is operatively attached when current is caused to flow to the solenoid.

Incorporated in this circuit is a switch which is actuated in response to the light sensor so that when sufficient light is available to illuminate the scene without the use of a flashcube, current to the flashcube igniting circuit is cut off. At the same time the current to the flashcube is cut off so also is the current to the low light indicator lamp provided to indicate the need for flash illumination of the scene.

INTENT OF THE DISCLOSURE

Although the following disclosure offered for public dissemination is detailed to insure adequacy and aid in the understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the improvements or combinations in which the inventive concepts are found.

There has been chosen a specific embodiment of the solenoid-actuated mask providing an automatic exposure control for cameras and showing a preferred circuit in which the output current from a light sensor causes the current flow to the solenoid or electromagnet to be cut off.

This specific embodiment and circuit has been chosen for the purposes of illustration and description as shown in the accompanying drawings wherein:

BRIEF DESCRIPTION OF THE DRAWINGS

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Figure 1:
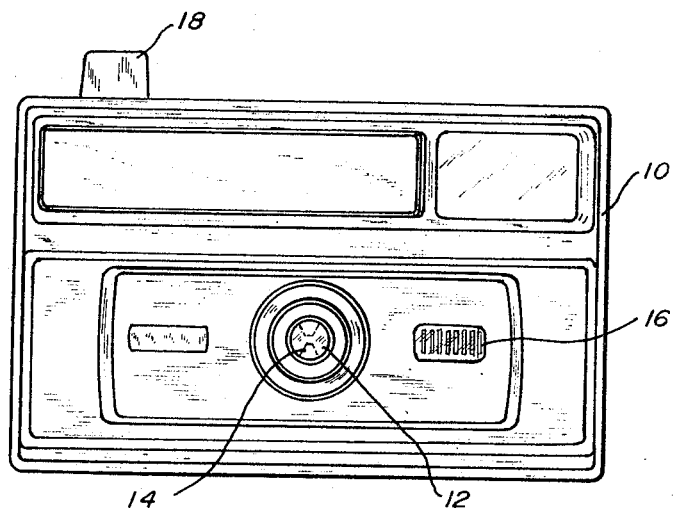
FIG. 1 represents a front face view of a camera such as uses the mechanism of this invention and showing a preferred relationship or positioning of the lens and the photosensor in respect to the other several components of the camera.

Referring now to the camera as shown in FIG. 1 there is provided a housing 10 which may be of molded plastic or may be a die casting and the like. In this front view there is seen a lens 12 mounted in a customary manner. This lens has a mask portion 14 which is disposed to provide a determined maximum aperture. To the right of the lens 12 there is shown an outside cover or guard 16 for an internally mounted photosensor of conventional construction. Extending above the housing 10 there is seen the upper button end of a lever which is pushed downwardly to actuate the mechanism of the camera which includes the rotation and firing of a flash cube, and in addition to the firing of the cube actuates a shutter. This apparatus is more completely shown in the above-referenced application of S. OKI, Ser. No. 827,650.

Figure 2:
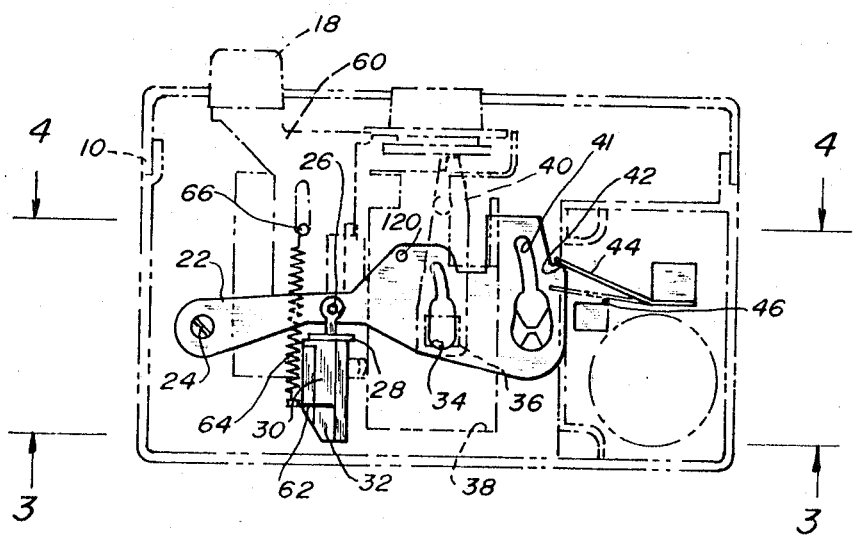
FIG. 2 represents a somewhat schematic view of the front view of the camera of FIG. 1, but showing the interior arrangement of several of the components providing the exposure control mechanism and in particular the mask lever and solenoid or electromagnet mechanism, the exposure control mechanism being in solid outline and with the camera housing and other associated components being shown in dashed or phantom outline.

Referring now in particular to FIG. 2, it is to be noted that mounted within and carried by housing 10 is a mask arm 22 which is pivotally mounted by means of a screw 24 at its left end. This screw is mounted and retained in a support post formed as a part of the housing. A short distance to the right of the screw 24 there is mounted on and carried by arm 22 a pivot pin 26 which carries a magnet bar 28 disposed to be attracted by the upper end of an actuated solenoid or electromagnet 30. This solenoid is attached to a base 32 which is adapted to movably carry the solenoid or electromagnet so that its upper end is in engagement with bar 28 when the arm 22 is in the "at-rest" position of FIG. 2. Immediately to the right and a short distance from pivot pin 26 there is provided in arm 22 a contoured opening 34 disposed to meter the lighted scene previously passed through the lens 12. This lighted scene passes to and through this opening 34 and then through a shutter opening 36 formed in a main plate 38. This plate provides and acts as the front support member of the camera mechanism. Pivotally carried on this plate 38 is a shutter 40 which in the present embodiment is disposed to be actuated by the rotation of a lamp socket more completely shown and described in the above-identified U.S. Pat. application Ser. No. 827,650. Referring still to mask arm 22, there is seen a short distance further to the right of the opening 34 another contoured opening 41 which is disposed to provide a metered passage to the sensing surface of a photosensor not shown in FIG. 2. On the right-hand edge of the arm 22 there is provided a shoulder 42 disposed to engage an electrical contact finger 44 of spring metal composition which is movable from the position shown in solid outline to the position shown in dashed outline whereat the finger engages a switch contact 46.

Figure 4:
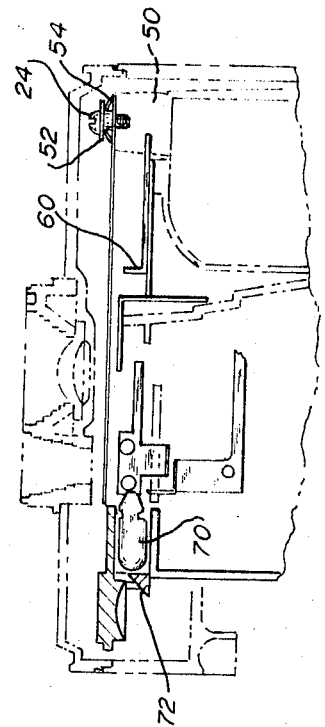
FIG. 4 represents a somewhat schematic top view as taken on the line 4—4 of FIG. 2 and showing the mask lever in relation to certain of the other camera parts and the housing with the housing being shown in phantom outline.
Figure 3:
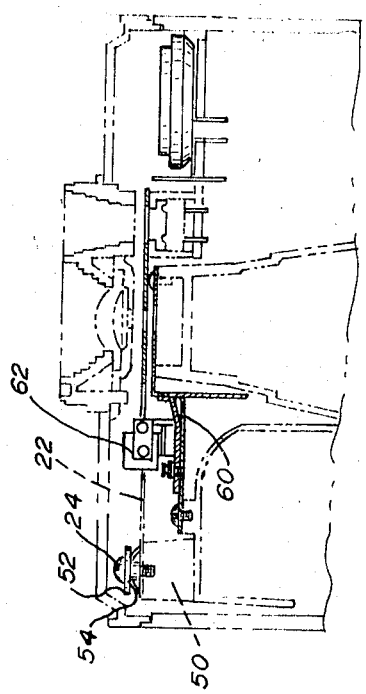
FIG. 3 represents a somewhat schematic bottom sectional view as taken on the line 3—3 of FIG. 2 and showing in particular the arrangement of the mask lever in relation to the lens and aperture and to the solenoid mounting on the shutter release lever and its relation to the housing of the camera.

Referring next to FIGS. 3 and 4 it is to be noted that arm 22 is preferably mounted upon a molded support portion 50 of the housing 10. A washer 52 is carried underneath the head of screw 24 and is axially located by a shoulder body portion on the screw which provides the pivot support or shaft for the arm 22. Between the washer 52 and the arm 22 there is disposed a cup-shaped or wave spring washer 54 which as the screw 24 is tightened into position with the shoulder body against the support 50 becomes tensioned to provide a thrust against washer 52. The washers 52 and 54 cooperate to provide a friction or brake means which is adjustably set as washer 54 is flattened into a determined tension by rotation of screw 24.

Button end 18 is attached to a front slide member 60 which acts as the shutter release member. This slide member has a shelf 62 upon which the lower part or end of solenoid or electromagnet 30 rests and is attached as seen in both FIGS. 2 and 3. A tension spring 64 has one end attached to the shelf 62 and has its other end attached to a guide post 66 carried by the housing 10. The spring urges slide 60 to the "up" position which is the "at-rest" condition of the camera mechanism.

Also seen in FIG. 4 is a signal lamp 70 preferably of a reddish hue which indicates through prism 72 the existing light level "read" by the sensor. When the light level is "low" the signal lamp 70 is caused to light and indicate that a flashcube or other light assist means is needed. When the light level is "high" or acceptable the sensor signal output cuts off the electrical current flow to the signal lamp 70 and also to the flashcube firing circuit.

Figure 5:
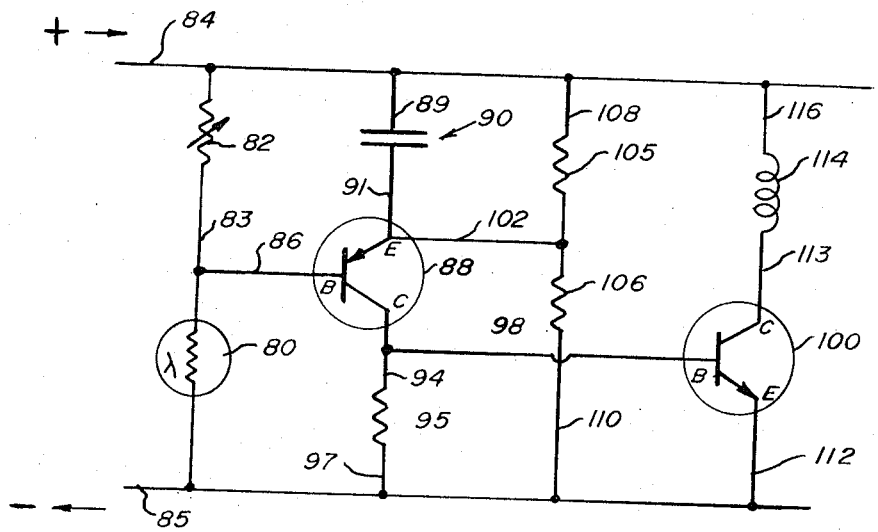
FIG. 5 represents a circuit diagram of the electrical components provided for the operation of the solenoid-actuated exposure control mechanism of this camera.

Referring next to FIG. 5 and the electronic circuit there illustrated, this circuit is a bridge circuit utilizing the output of a photosensor 80 as a switch control. A variable resistance 82 is series connected by lead 83 to positive and negative conductors 84 and 85. From lead 83 a conductor 86 is attached to the base connection of a p-n-p transistor 88. Conductor 89 is attached to conductor 84 and extends to one side of a condenser 90. From the other side of condenser 90 a connector 91 extends to the emitter connection of transistor 88. From the collector post of transistor 88 a lead 94 extends to one side of a fixed resistor 95 and from the other side a connector 97 is attached to conductor 85. Also from the collector terminal of the transistor 88 a lead 98 extends to the base connection of a n-p-n transistor 100.

From the emitter connection of transistor 88 there is also provided a lead 102 extending between and connected at each end of one end of fixed resistors 105 and 106. The other end of resistor 105 is attached by lead 108 to conductor 84. The other end of resistor 106 is attached by lead 110 to conductor 85. The emitter terminal of transistor 100 is connected by lead 112 to conductor 85. The collector terminal of transistor 100 is connected by lead 113 to one end of a coil 114 of solenoid or electromagnet 30. The other end of coil 114 is connected by lead 116 to conductor 84.

Operation of the Circuit of FIG. 5

The bridge circuit of FIG. 5 includes one leg or branch which includes the variable resistance 82 and photosensor 80. The other leg or branch includes the fixed resistors 105 and 106 and the leads 108, 109 and 110. It is contemplated that the light falling on the photosensor will be a function of the camera setting (Time and F stop size). At the maximum setting of the camera (i.e. greatest time, largest stop) the bridge circuit will be balanced until a correct or desired setting is reached.

The transistor 88 is connected so that it will conduct when the voltage from the branch or leg which includes the resistors 105 and 106 is higher than the voltage in the branch carrying light sensor 80 and variable resistance 82. When a balance of the voltage through the two legs is achieved the transistor 88 will cut off current through amplifying transistor 100 and through the coil 114 of the solenoid 30. This cutoff of current to the coil of the solenoid also cuts off the holding attraction for magnetic bar 28 causing it to drop off the end of the solenoid.

In the mechanism of the reference application, Ser. No. 827,650, the shutter, as it is swung, engages a fixed stop which not only limits the swing of the shutter but the harder the shutter hits the stop the quicker it returns to cover the aperture. The speed of rotation of the flashcube socket in both the reference application and the mechanism of this invention varies according to whether there is a flashcube present or not. It is this speed of rotation of the socket which governs the velocity of the swing of the shutter as the weight of the flashcube causes the speed of rotation to be slow. This changes the exposure time which is thus increased for flash illumination. In the present mechanism the downward movement of arm 22 provides this means for automatically increasing the speed of the shutter.

In arm 22 and at a point a short distance to the left of the contoured opening 34 and above and to the right of the pivot pin 26 there is provided a stop abutment or pin 120 which is disposed to engage the left edge of shutter 40 as it is swung clockwise to uncover shutter opening 36. As mask arm 22 is swung downwardly around screw 24 the stop pin 120 is also moved downwardly and with this motion progressively shortens the extent of swing permitted of the shutter 40. As the swing of the shutter is shortened so also is the return swing of the shutter to the covered condition. In this manner the downward movement of mask arm 22 which is indicative of and is responsive to the level of light available for exposure also provides an increase of speed and a shortening of the exposure time as arm 22 is moved downwardly to automatically provide the desired exposure setting.

Figure 6:
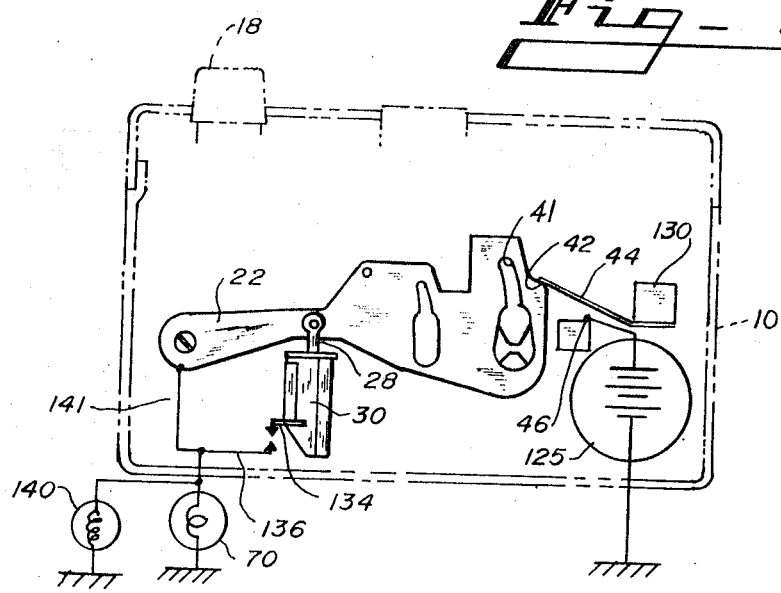
FIG. 6 is a front view of the camera of FIG. 1 with a somewhat schematic representation showing of the circuit of FIG. 5 as applied to the several components providing the automatic exposure control.

Arrangement of FIG. 6

Referring now to the partly schematic front view of FIG. 6 it is noted that a battery 125 is removably mounted at the lower right of the housing 10. One side of this battery is connected to a common ground while the other side is connected to contact 46. Spring conductor 44 has its right end fixedly attached to a support 130 and its left end is disposed to rest on a shoulder 42 provided on mask arm 22 which is made of an electrically conductive material such as metal. Solenoid support shelf 62 is electrically connected to arm 22 so that a particular contact point 134 is disposed to engage a spring contact 136 after the support shelf has been moved downwardly a short distance from the "at-rest" condition. Signal lamp 70 is connected at one side to a leaf contact 136 and at the other side is connected to the ground of the system. The circuit for firing the flashlamp 140 is also connected at one side to the leaf contact 136 and at the other side to ground. A connection 141 extends from contact 136 to mask arm 22.

contoured opening 41 to be brought in way of the light sensor 80. As the contoured opening 41 reduces the light received by the photosensor the current flow in the bridge circuit containing the photosensor is decreased until balance is achieved, whereupon the transistor 88 ceases to conduct and the trigger to transistor 100, which is the amplifying transistor, causes flow through transistor 100 and coil 114 to be cut off. When the current to the solenoid is cut off and the solenoid no longer acts as an electromagnet, the magnetic bar 28 is released and the downward travel of mask arm 22 is stopped by the brake action of screw 24. Slide member 60 is urged or moved further downwardly by the operator and causes the shutter 40 to be actuated for the taking of a picture. When the light level falling on the photosensor is below that which is considered adequate light, the movement of mask arm 22 is continued until contact 134 engages leaf contact 136 and current will flow to cause light 70 to be illuminated and photoflash 140 to be fired at a determined time.

It is to be noted that if the operator pushes the slide member 60 downwardly at a too great a rate of speed, the mask arm 22 may be caused to overtravel or cause a too slow a photosensor response. To speed up the photosensor response, the capacitor 90 is added to the emitter circuit of transistor 88.

It is to be further noted that when the "F"-stop (aperture exposure) is fixed, the "T" (time or speed) is increased by the moving stop pin 120 on arm 22, the aperture opening is correspondingly reduced by the moving mask and the contoured opening 34. For example, in the downward actuation of front slide member 60 as it carries the solenoid or electromagnet, the mask arm 22 is pulled downwardly until a balance in the circuit is reached whereupon the current to the solenoid is cut off and the arm 22 remains at this cutoff location while slide member 60 continues to the bottom of the stroke.

The following chart gives a ready reference to typical sequences of actions in which different light levels are shown. Typical percentages of the downward travel of the front slide member 60 are given as reference points in the operation of the front slide member.

CHART 1

| Percent travel of slide member 60 | Switch 44-42 | Switch 44-46 | Switch 136-134 | Low light warning (lamp 70) | Flashcube connected (lamp 140) | F Number | T (speed seconds) | Light value |
|---|---|---|---|---|---|---|---|---|
| 0 | On | Off | Off | Off | No | 8 | 1/30 | Low. |
| 10 | On | Off | Off | Off | No | 8 | 1/30 | Low. |
| 20 | On | On | On | On | Yes | 8 | 1/30 | Low. |
| 100 | On | On | On | On | Yes | 8 | 1/30 | Low. |
| 0 | On | Off | Off | Off | No | 8 | 1/30 | 14 |
| 10 | On | On | Off | Off | No | 8 | 1/30 | 14 |
| 20 | Off | On | On | Off | No | 8 | 1/30 | 14 |
| 30 | Off | On | On | Off | No | 9½ | 1/50 | 14 |
| 40 | Off | On | On | Off | No | 11 | 1/90 | 14 |
| 50 | Off | On | On | Off | No | 11 | 1/90 | 14 |
| 100 | Off | On | On | Off | No | 11 | 1/90 | 14 |

Operation of Arrangement of FIG. 6

It is assumed that the camera of this invention has a flashcube mounted in the rotary socket and the spring contacts, as shown in reference application Ser. No. 827,650, for engaging the rotary flashcube are electrically connected with one contact connected to ground and the other conductively connected to the leaf contact 136. Lamp 70 is also electrically connected so that with a flow of current to and through contact 136 the lamp 70 is illuminated to provide a visual "low light" signal to the operator. This signal is adapted to be viewed by the operator at the top of the camera either through a small signal window at the top of the camera or by a prism 72 as seen through the viewing aperture. As the front slide member 60 is pushed downwardly, the spring leaf 44 is brought into conductive engagement with shoulder 42 whereupon current flows through the circuit with arm 22 acting as a part of conductor 84. Only with sufficient light does current flow through coil 114 to draw the magnetic bar 28 into engagement with the end of the solenoid 30. As the slide member 60 is moved downwardly the magnetically attracted mask arm 22 is moved to cause the reduced upper portion of When the light level is low to the extent that a flashlamp is needed to satisfactorily illuminate the scene the low light warning lamp 70 is illuminated and the circuit for firing a flashlamp is connected when the slide member 60 has traveled 20 percent downwardly. The "F"-stop is equal to eight and the shutter exposure time "T" is one-thirtieth of a second which occurs only once during the complete actuation of slide member 60.

Referring now to the chart it is to be noted that the light level indicator remains "off" for the whole cycle of slide member 60 and since it is a part of the same circuit, the flashlamp firing circuit also remains "off" for the whole travel of the slide member so that a flashlamp is not fired during the exposure. As the mask arm 22 is moved downwardly the "F"-stop at 30 percent travel changes to 9½ and at 40 percent travel and more the aperture size is equal to an "F"-stop of eleven. At this same time, the exposure time "T" changes from an initial one-thirtieth of a second to one-fiftieth of a second at 30 percent travel thence to one-ninetieth of a second at a travel of 40 percent onward.

SUMMARY

As above-described, the camera mechanism of this invention provides means for automatically setting the aperture and shutter. The mechanism provides a simple and inexpensive means of coupling the shutter release and camera exposure controls so that as the shutter release lever is first moved an electromagnet carried by this lever is adapted to retain a mask arm which is moved until the correct exposure setting is reached as determined by the output of a light sensor. At this point the solenoid or electromagnet is cut off leaving the mask arm at this setting while the shutter release lever continues in its normal course.

The chart and other references to the "F"-stop and "T" time settings have been chosen as typical examples of use. Other values to accommodate conditions of exposure can, of course, be provided as desired as, of course, can the percentages of movement of the release lever to cause the switches to be opened or closed. What is considered to be novel is a mask arm which is disposed to swing around a pivot pin and to be moved by an electromagnet means carried by a shutter release lever. In the circuit for these controls a photosensor provides a current flow disposed to actuate an amplifying transistor when the desired exposure is reached. This circuit provides means for lighting a lamp indicating a low light level and connecting or cutting off a photoflash lamp igniting circuit to the electrical source. An inexpensive automatic time regulator for the shutter swing is provided on the moving mask arm.

It is of course recognized that instead of the washer 54 another means may be provided, such as a fiber disc, a magnet or other brake device providing a drag which may be overcome by the pull of the electromagnet carried by the front slide member 60. The switch for connecting the flashlamp 140 and indicator light 70 need not be provided to permit the automatic control to work satisfactorily. It is also noted that the stop pin 120 need not be provided on arm 22 to permit the automatic control to work; however, the preferred embodiment having these components does provide a camera mechanism having automatic control over the firing of a flashcube and the duration of shutter movement to uncover the exposure aperture.

Terms such as "left", "right", "up", "down", "bottom", "top", "front", "back", "in", "out", "clockwise", "counterclockwise" and the like are applicable to the embodiment shown and described in conjunction with the drawings. These terms are merely for the purposes of description and do not necessarily apply to the position in which the camera mechanism for automatic exposure control may be constructed or used.

While a particular embodiment of the solenoid or electromagnetically actuated mask arm and its application to camera mechanisms has been shown it is to be understood the invention is not limited to this specific embodiment shown since modifications may be made within the true scope of the accompanying claims and protection is sought to the broadest extent the prior art allows.

What is claimed is:

1. A camera mechanism for automatically controlling the exposure of a film in a camera, said mechanism including: (a) a camera housing; (b) a main plate carried by the housing; (c) a shutter release member carried by and movable on said main plate; (d) an electromagnetic means carried by and movable with the shutter release member; (e) a shutter disposed to be moved in response to the movement of the shutter release member and during this movement to uncover an exposure aperture through which light passes to a film in the camera; (f) a photosensor carried within the housing and disposed to "read" the light from the scene to be photographed; (g) a mask arm pivotally mounted within the housing so as to be movable in front of both the exposure aperture and the photosensor, said arm having means for magnetic attraction to and releasable holding to the electromagnetic means carried by the shutter release member, said mask arm having means for metering the light passing through the exposure aperture and also having means for metering the light being "read" by the photosensor; (h) a brake means for restraining the free movement of the mask arm around the pivotal support, and (i) an electronic circuit carried within the housing and adapted to receive the electrical output of the photosensor and feed said output into a bridge circuit having a switching means disposed to cut off the current to and through the coil of the electromagnetic means when the output of the photosensor reaches a determined level, said electromagnetic means, as it is carried by the release member, magnetically attracting the mask arm to move the arm against the resistance of the brake means with the electromagnetic means continuing until the light of the photosensor is diminished by the metering mask to cause the photosensor output to reach a desired level to cut off current to the electromagnet and to release the arm to the action of the brake.

2. A camera mechanism for automatically controlling the exposure of a film as in claim 1 in which the means for metering the light received by the photosensor is a contoured opening formed in the mask arm.

3. A camera mechanism for automatically controlling the exposure of a film as in claim 2 in which the means for metering the light passing through the exposure aperture is a contoured opening formed in the mask arm.

4. A camera mechanism for automatically controlling the exposure of a film as in claim 1 in which the means for magnetic attraction is a magnet bar pivotally attached to the mask arm.

5. A camera mechanism for automatically controlling the exposure of a film as in claim 1 in which the brake means for restraining the free rotative movement of the mask arm is a cup shaped washer flattened to a determined extent, the flattened washer mounted on the same pivot support as in the mask arm.

6. A camera mechanism for automatically controlling the exposure of a film as in claim 1 in which the brake means for retaining the free rotative movement of the mask arm is a wave-washer flattened to a determined extent, the flattened washer mounted on the same pivot support as is the mask arm.

7. A camera mechanism for automatically controlling the exposure of a film as in claim 1 in which the photosensor is in a branch of the bridge circuit which also includes a variable resistance which is adjusted so as to provide a desired voltage level which when achieved triggers a transistor which provides the switching means which cuts off the current flowing through the coil of the electromagnet.

8. A camera mechanism for automatically controlling the exposure of a film as in claim 1 in which there is provided in the electronic circuit a switching means disposed to provide a voltage carrying circuit to a flashcube electronic firing circuit during the time the current is caused to flow through the electromagnetic means.

9. A camera mechanism for automatically controlling the exposure of a film as in claim 8 in which there is provided a signal lamp connected in the voltage carrying circuit to the flashcube firing circuit so that when the current flows through the electromagnet it also flows through the signal lamp.

10. A camera mechanism for automatically controlling the exposure of a film in a camera, said mechanism including: (a) a camera housing; (b) a shutter release member carried and movable within said housing; (c) an electromagnetic means carried by and movable with the shutter release member; (d) a photosensor carried within the housing and disposed to receive the light from the scene to be photographed, and (e) an electronic circuit carried within the housing and adapted to receive the electrical output of the photosensor and feed said output to a circuit having a switching means disposed to cut off the current to and through the coil of the electromagnetic means when the output of the photosensor reaches a determined level, said shutter release member actuating a leaf switch arranged to engage two contacts so positioned that both contacts will be in engagement with the leaf switch when the brightness of the scene as "read" by the photosensor is insufficient to provide necessary illumination for photography of the scene.

11. A camera mechanism for automatically controlling the exposure of a film as in claim 10 in which the leaf switch is arranged so that the electronic circuit is brought into a first mode of operation when the two contacts are first brought into simultaneous engagement with the leaf switch.

12. A camera mechanism for automatically controlling the exposure of a film in a camera, said mechanism including: (a) a camera housing; (b) a main plate carried by the housing; (c) a shutter release member carried by and movable on said main plate; (d) an electromagnetic means carried by and movable with the shutter release member; (e) a shutter disposed to be moved in response to the movement of the shutter release member and during this movement to uncover an exposure aperture through which light passes to a film in the camera; (f) a photosensor carried within the housing and disposed to receive the light from the scene to be photographed, and (g) an electronic circuit carried within the housing and adapted to receive the electrical output of the photosensor and feed said output into a bridge circuit having a switching means disposed to cut off the current to and through the coil of the electromagnetic means when the output of the photosensor reaches a determined level, said electromagnetic means as it is carried by the shutter release member having a provision for overtravel so that the exposure controls may be moved by the electromagnetic means until the switching current is cut off, after which the shutter release member is continued through its normal actuation while the exposure controls are left set for best exposure.

13. A camera mechanism for automatically controlling the exposure of a film as in claim 12 in which there is provided a mask arm providing means for metering the light to the photosensor, said mask arm movable with and by the electromagnetic means which is a solenoid.

* * * * *